US011832622B2

(12) United States Patent
Yeaman

(10) Patent No.: US 11,832,622 B2
(45) Date of Patent: *Dec. 5, 2023

(54) AUTOMATED MONITORING AND CONTROL OF FOOD PROCESSING SYSTEMS

(71) Applicant: SAFE FOODS CORPORATION, North Little Rock, AR (US)

(72) Inventor: Tim Yeaman, Russellville, AR (US)

(73) Assignee: SAFE FOODS CORPORATION, North Little Rock, AR (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/533,863

(22) Filed: Nov. 23, 2021

(65) Prior Publication Data
US 2022/0079176 A1    Mar. 17, 2022

Related U.S. Application Data

(63) Continuation of application No. 16/481,022, filed as application No. PCT/US2018/015042 on Jan. 24, 2018, now Pat. No. 11,213,040.

(Continued)

(51) Int. Cl.
*G05B 15/02*    (2006.01)
*A22C 21/06*    (2006.01)
(Continued)

(52) U.S. Cl.
CPC ............. *A22C 21/06* (2013.01); *A22B 7/008* (2013.01); *A22C 21/0061* (2013.01); *A23B 4/06* (2013.01);
(Continued)

(58) Field of Classification Search
CPC ............... F17C 3/00; F17C 2201/0171; F17C 2203/013; F17C 2205/0103;
(Continued)

(56) References Cited

U.S. PATENT DOCUMENTS 5,362,949 A    11/1994  Gulick
9,164,498 B2   10/2015  Lorton et al.
(Continued)

FOREIGN PATENT DOCUMENTS

CA         2548762 A1    8/2005

OTHER PUBLICATIONS

First Office Action for Israeli Patent Application No. 289414 by the Israeli Patent Office, dated Jun. 13, 2022, (6 pgs.).

(Continued)

*Primary Examiner* — Santosh R Poudel
(74) *Attorney, Agent, or Firm* — HAYNES AND BOONE, LLP

(57) ABSTRACT

Systems and methods for automated monitoring and control of food processing systems are disclosed. Data from one or more controllers of a food processing system is received during operation of the food processing system at a remote food processing facility. Values of one or more operating parameters of the food processing system are monitored, based on the received data. At least one event of interest occurring during the operation of the food processing system is detected, based on the monitored values of the one or more operating parameters. Control signals for adjusting a configuration of the food processing system are transmitted to the one or more controllers, based on the detected event.

14 Claims, 11 Drawing Sheets

Related U.S. Application Data

(60) Provisional application No. 62/452,214, filed on Jan. 30, 2017.

(51) Int. Cl.
| | |
|---|---|
| *A22B 7/00* | (2006.01) |
| *A22C 21/00* | (2006.01) |
| *A23B 4/06* | (2006.01) |
| *A23B 4/20* | (2006.01) |
| *A23B 4/30* | (2006.01) |

(52) U.S. Cl.
CPC .............. *A23B 4/20* (2013.01); *A23B 4/30* (2013.01); *G05B 15/02* (2013.01); *A23V 2002/00* (2013.01)

(58) Field of Classification Search
CPC ...... F17C 2205/0305; F17C 2209/2181; F17C 2209/221; F17C 2209/232; F17C 2221/033; F17C 2227/0135; F17C 2270/0168; F17C 2203/0636; F17C 2221/035; F17C 2223/033; F17C 2270/0171; F17C 1/14; F17C 2201/0157; F17C 2201/054; F17C 2201/056; F17C 13/084; F17C 2203/0617; F17C 2205/0192; F17C 2223/0153; F17C 2227/0178; F17C 1/005; B60K 15/07; B60K 2015/03243; B60K 2015/0344; B60K 2015/0346
USPC .......................................................... 700/12
See application file for complete search history.

(56) References Cited

U.S. PATENT DOCUMENTS

| | | | |
|---|---|---|---|
| 2003/0094422 A1 | 5/2003 | Perkins et al. | |
| 2004/0067160 A1 | 4/2004 | Perkins | |
| 2005/0211643 A1* | 9/2005 | Phillips .............. | A22C 21/0061 210/764 |
| 2008/0095677 A1* | 4/2008 | McSherry ............. | C07C 407/00 422/117 |
| 2008/0242207 A1 | 10/2008 | Morris et al. | |
| 2009/0196967 A1 | 8/2009 | Nolen et al. | |
| 2009/0208616 A1 | 8/2009 | Perkins | |
| 2010/0082149 A1 | 4/2010 | Till et al. | |
| 2010/0198024 A1 | 8/2010 | Elazari-Volcani et al. | |
| 2010/0250198 A1 | 9/2010 | Lorton et al. | |
| 2011/0281002 A1 | 11/2011 | Burwell et al. | |
| 2012/0009309 A1 | 1/2012 | Dorsten et al. | |
| 2012/0116577 A1* | 5/2012 | Ottomanelli ............ | G07F 9/105 700/232 |
| 2012/0308988 A1* | 12/2012 | Discenzo ............... | G05B 13/04 435/286.1 |
| 2014/0352632 A1 | 12/2014 | McLaughlin | |
| 2015/0096267 A1 | 4/2015 | Svensson | |
| 2016/0063387 A1 | 3/2016 | Srivastava | |
| 2016/0066589 A1* | 3/2016 | Massey .................. | G01F 23/00 702/55 |
| 2016/0120144 A1 | 5/2016 | Kim et al. | |

OTHER PUBLICATIONS

Office Action for Brazilian Patent Application No. 1120190154710 by the Brazilian Patent Office, dated May 11, 2022, (4 pgs.).

English Translation of Office Action for Brazilian Patent Application No. 1120190154710 by the Brazilian Patent Office, dated May 11, 2022, (2 pgs.).

"Anderson et al. Building an On-farm Poultry Processing Facility, Jul. 2012, nespf.org,https://sare.org/wp-content/uploads/MPPU-Replication-Guide.pdf, pp. 1-6)" (Year: 2012).

Extended European Search Report for European Patent Application No. 18744402.1 dated Apr. 17, 2020, (6 pgs.).

First Examiner's Requisition for Canadian Patent Application No. 3,051,399 by the Canadian Intellectual Property Office, dated Nov. 6, 2020, (4 pgs.).

International Search Report and Written Opinion for International Application No. PCT/US2018/015042 dated Apr. 5, 2018, (7 pgs.).

Second Office Action for Canadian Patent Application No. 3,051,399 issued by the Canadian Intellectual property Office, dated Apr. 12, 2021, (4 pgs.).

European Examination Report for European Patent Application No. 18744402.1 issued by the European Patent Office, dated Jan. 20, 2021, (6 pgs.).

Summons to Oral Proceedings for European Patent Application No. 18744402.1 issued by the European Patent Office, dated Oct. 25, 2021, (5 pgs.).

A—Facts and submissions for European Patent Application No. 18744402.1 issued by the European Patent Office, dated May 2, 2022, (12 pgs.).

Office Action for Israeli Patent Application No. 289414 issued by the Israeli Patent Office, dated May 7, 2023, (5 pgs.).

Guastalli, B. H. L., et al., "Evaluation of Disinfectants Used in Pre-Chilling water Tanks of Poultry Processing Plants", Brazilian Journal of Poultry Science, Jun. 1, 2016, vol. 18, No. 2, pp. 217-224, XP055894427, DOI: 10.1590/1806-9061-2015-0110. Retrieved from the Internet: URL:https://www.scielo.br/j/rbca/a/XYW5ky54jC6MpZGZYzRYHQd/?format=pdf&lang=en, (8 pgs.).

* cited by examiner

FIG. 8

| Date | Event |
|---|---|
| 8/2/2016 1:17:00 PM | Stats: CPU 15% Task Switches/Sec 2689; Tasks Running 16; Uptime 7 Days 6 Hours 12 Minutes 24 Sec... |
| 8/2/2016 12:16:15 PM | Stats: CPU 14% Task Switches/Sec 2686; Tasks Running 16; Uptime 7 Days 5 Hours 11 Minutes 40 Sec... |
| 8/2/2016 11:15:32 AM | Stats: CPU 14% Task Switches/Sec 2687; Tasks Running 16; Uptime 7 Days 4 Hours 10 Minutes 57 Sec... |
| 8/2/2016 10:14:48 AM | Stats: CPU 13% Task Switches/Sec 2692; Tasks Running 16; Uptime 7 Days 3 Hours 10 Minutes 14 Sec... |
| 8/2/2016 9:14:05 AM | Stats: CPU 14% Task Switches/Sec 2682; Tasks Running 16; Uptime 7 Days 2 Hours 9 Minutes 31 Sec... |
| 8/2/2016 8:13:23 AM | Stats: CPU 14% Task Switches/Sec 2684; Tasks Running 16; Uptime 7 Days 1 Hours 8 Minutes 49 Sec... |
| 8/2/2016 08:06:21 AM | Water Meter 1 -- High Water Flow |
| 8/2/2016 08:06:16 AM | Water Meter 1 -- High Water Flow -- Cleared |
| 8/2/2016 08:06:25 AM | Water Meter 1 -- High Water Flow |
| 8/2/2016 08:06:00 AM | Water Meter 1 -- High Water Flow -- Cleared |
| 8/2/2016 08:06:25 AM | Water Meter 1 -- High Water Flow |
| 8/2/2016 08:02:37 AM | Water Meter 1 -- High Water Flow -- Cleared |
| 8/2/2016 08:02:22 AM | Water Meter 1 -- High Water Flow |
| 8/2/2016 08:02:13 AM | Water Meter 1 -- High Water Flow -- Cleared |
| 8/2/2016 7:12:40 AM | Stats: CPU 14% Task Switches/Sec 2682; Tasks Running 16; Uptime 7 Days 0 Hours 8 Minutes 6 Sec... |
| 8/2/2016 6:11:59 AM | Stats: CPU 14% Task Switches/Sec 2686; Tasks Running 16; Uptime 6 Days 23 Hours 7 Minutes 25 Sec... |
| 8/2/2016 5:30:59 AM | Water Meter 1 -- High Water Flow |
| 8/2/2016 5:29:57 AM | Water Meter 1 -- High Water Flow -- Cleared |
| 8/2/2016 5:26:57 AM | Water Meter 1 -- High Water Flow |
| 8/2/2016 5:31:07 AM | Water Meter 1 -- High Water Flow -- Cleared |
| 8/2/2016 5:30:25 AM | Water Meter 1 -- High Water Flow |

FIG. 9

| System | | ID | Description | ☐ Email | ☐ Alerts | ☐ Cell |
|---|---|---|---|---|---|---|
| ☐ Safe Foods Corporation – Demo Plant | Acid System | | | | | |
| | Chiller Caustic | 0 | Chemical Pump Max Frequency Exceeded | ☐ | ☐ | ☐ |
| | Chiller PAA | 1 | Water flow is under min flow rate | ☐ | ☐ | ☐ |
| | Acid Dip Tank | 2 | Water meter max flow rate exceeded | ☐ | ☐ | ☐ |
| | Finishing Chiller | 3 | Injection Pressure Sensor Failure | ☐ | ☐ | ☐ |
| | NYBW PAA | 4 | No Chemical Flow | ☐ | ☐ | ☐ |
| | OLR PAA | 5 | No Water Flow | ☐ | ☐ | ☐ |
| | PAA Dip Tank | 6 | Water Meter 1 – Low Water Flow | ☐ | ☐ | ☐ |
| | Parts Spray PAA | 7 | MicroSD Read Failure | ☐ | ☐ | ☐ |
| | Pre Chiller Caustic | 13 | pH High Alert | ☐ | ☐ | ☐ |
| | Pre Chiller PAA | 14 | pH Low Alert | ☐ | ☐ | ☐ |
| | Water Monitoring 1 | 15 | pH Probe Failure | ☐ | ☐ | ☐ |
| | Water Monitoring 2 | 18 | Mixing Pump Comm Failure | ☐ | ☐ | ☐ |
| | | 20 | AD Calibration Load Failure | ☐ | ☐ | ☐ |
| | | 21 | Chemical Pump Auto Calibration Failure | ☐ | ☐ | ☐ |
| | | 22 | No Solution Flow On Probe | ☐ | ☐ | ☐ |

Alerts — Save ⊘ Cancel  Start Time 12:00 AM  End Time 11:59 PM  ☐ Disable All Alerts  12 Systems Selected

AUTOMATED MONITORING AND CONTROL OF FOOD PROCESSING SYSTEMS

CROSS-REFERENCE TO RELATED APPLICATIONS

The present application is a continuation of U.S. Nonprovisional patent application Ser. No. 16/481,022, filed on Jul. 25, 2019 as a National Stage Entry of International Patent Application No. PCT/US2018/015042, filed on Jan. 24, 2018, which claims the benefit of U.S. Provisional Patent Application No. 62/452,214, filed on Jan. 30, 2017, each of which is titled "Automated Monitoring and Control of Food Processing Systems," and the disclosure of each of which is incorporated herein by reference in its entirety.

TECHNICAL FIELD

The present description relates to food processing systems, and more particularly, to monitoring and controlling operational aspects of food processing systems.

BACKGROUND

Industrial food processing operations typically involve an array of interactions between complex processes, equipment, regulations, products, logistics, information technology, personnel, and stakeholders. Conventional systems and methods for managing such operations generally require personnel to be physically present at processing facilities in order to monitor equipment and processes to ensure proper functioning of the food processing systems located at those facilities. For example, personnel may be assigned to a particular division of the food processing facility for purposes of managing operations related to a particular food processing system within the facility. Due to the caustic environments in which these systems typically operate, the risk of equipment failure tends to be relatively high. Therefore, it is imperative that system parameters are continuously monitored and analyzed to diagnose potential problems that may arise during system operation. Such problems can include, for example, potential problems that may arise in a particular food processing system as a result of the operational behavior of another system.

However, the operational divide associated with conventional techniques creates an informational gap that hinders the ability of interested parties to obtain relevant cross-functional information for effectively monitoring and diagnosing potential operational issues. Furthermore, conventional techniques that rely primarily on personnel located at the facility to address problems that may relate to any of the multitude of complex system processes involved during a given operation may fail to quickly and efficiently identify and resolve these problems when they occur. This in turn may lead to reduced system performance and increased operational costs.

BRIEF DESCRIPTION OF THE DRAWINGS

The present disclosure is best understood from the following detailed description when read with the accompanying figures.

FIG. 8 illustrates an exemplary view of the GUI with an example of an event log for monitoring events of interest during the operation of a selected food processing system.

FIG. 9 illustrates a list of predefined events that a user may select to monitor during the operation of a selected food processing system.

DETAILED DESCRIPTION

Figure 1:
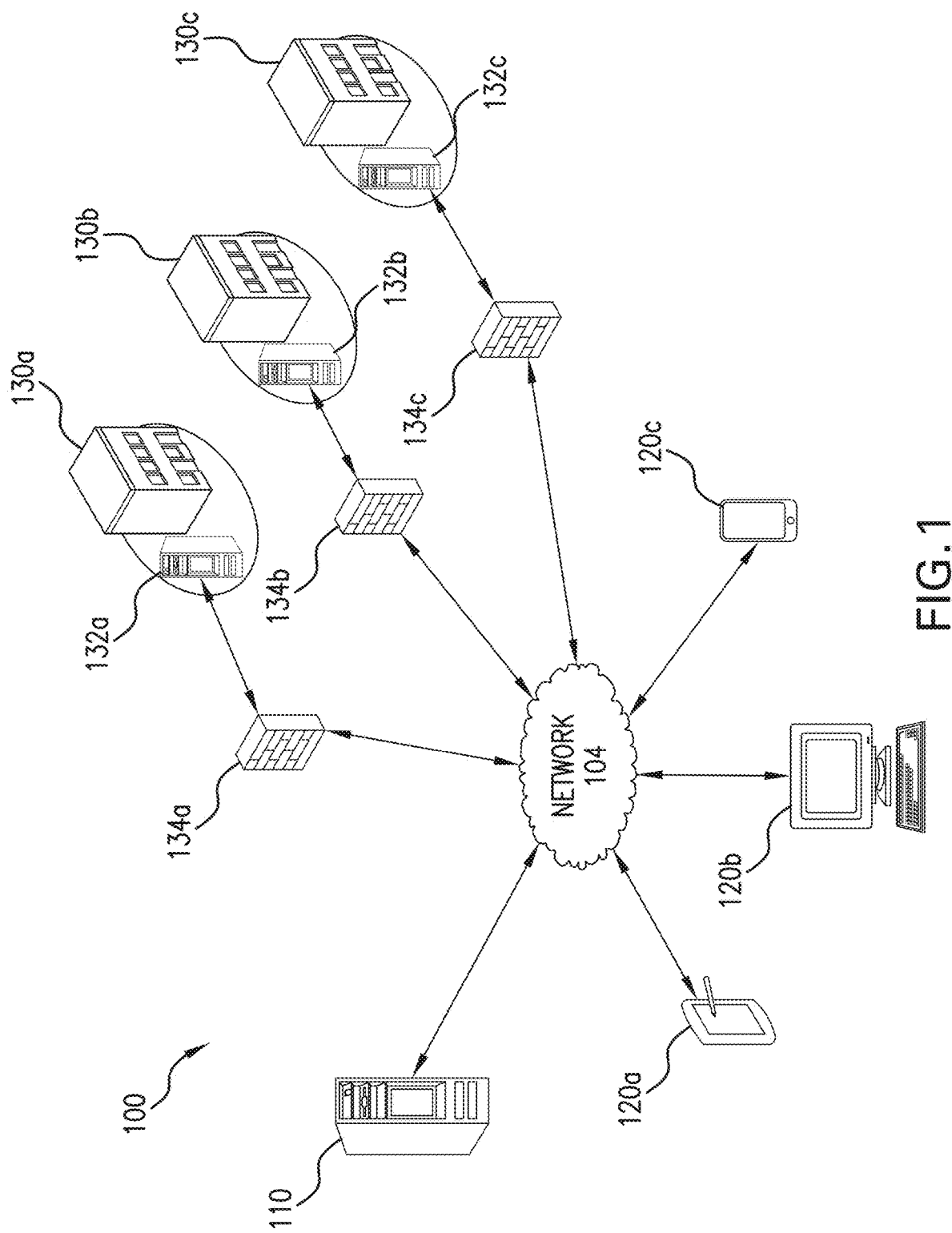
FIG. 1 is a diagram of an exemplary network environment for practicing one or more embodiments of the present disclosure.

Embodiments of the present disclosure relate to automated monitoring and control of remote food processing systems. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one or more embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to implement such feature, structure, or characteristic in connection with other embodiments whether or not explicitly described. It would also be apparent to one of ordinary skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Various embodiments include systems, methods, and computer-readable media for automated monitoring and control of remote food processing systems. As will be described in further detail below, embodiments of the present disclosure may be used to provide an automated control center and interface for monitoring operational aspects of various food processing systems of one or more remote food processing facilities. In one example, the food processing facility may be a poultry processing facility, and the plurality of food processing systems may include an evisceration system, a chiller system, an antimicrobial application system, an antimicrobial recycle system, and an antimicrobial capture system. However, it should be appreciated that embodiments of the present disclosure are not intended to be limited thereto.

Illustrative embodiments and related methodologies of the present disclosure are described below in reference to FIGS. 1-11 as they might be employed, for example, in a computer system for automated monitoring and control of remote food processing systems. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a diagram of an exemplary network environment 100 for practicing one or more embodiments of the present disclosure. In the example as shown in FIG. 1, network environment 100 includes a computing system 110, user devices 120a, 120b, and 120c (collectively referred to herein as "user devices 120a-c"), and controllers 132a, 132b, and 132c (or "controllers 132a-c," collectively). Controllers 132a-c in this example are associated with food processing facilities 130a, 130b, and 130c (or "food processing facilities 130a-c"), respectively. While only user devices 120a-c and control devices 132a-b are shown in FIG. 1, it should be appreciated that embodiments are not intended to be limited thereto and that network environment 100 may include any number of user devices and/or control devices, where the control devices may be for any number of food processing facilities.

Also, as shown in FIG. 1, computing system 110 is communicatively coupled to each of user devices 120a-c and controllers 132a-c via a network 104. Computing system 110 in this example may be implemented using any type of computing device having at least one processor, local memory, display, input device (e.g., a mouse, QWERTY keyboard, touch-screen, microphone, or a T9 keyboard) and networking capabilities for communicating via a network 104 with other computing devices, including user devices 120a-c and controllers 132a-c. Examples of such a computing device include, but are not limited to, a server, a group of servers in a server farm, a desktop computer, a workstation, a laptop computer, a tablet computer or other type of general-purpose or specialized computing device.

Similarly, user devices 120a-c may be any type of general-purpose or specialized computing device. Examples of different computing devices that may be used to implement any of user devices 120a-c include, but are not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. For example, user device 120a as shown in the example of FIG. 1 may be a tablet computer, a handheld computer, or a personal digital assistant (PDA) while user device 120b may be desktop or personal computer, and user device 120c may be a mobile handset, smartphone, cellular telephone, an enhanced general packet radio service (EGPRS) mobile phone, a media player, a navigation device, a game console, a camera or any combination thereof.

Network 104 can be any network or combination of wired and/or wireless networks that can carry data communication. Such network(s) may include, but are not limited to, one or more cellular networks, local area networks, medium area networks, and/or wide area networks, e.g., the Internet, or any combination thereof. Although not shown in FIG. 1, network 104 may include any of various routers, gateways, and other types of network devices for facilitating communications between computing system 110, user devices 120a-c, and controllers 132a-c. Further, such devices may support any of various communication protocols and standards as needed or desired for a particular implementation.

As will be described in further detail below, each of controllers 132a-c may be a component of a food processing system located at the respective food processing facilities 130a-c. The particular food processing system may be one of a plurality of food processing systems at each of food processing facilities 130a-c. In one or more embodiments, each of controllers 132a-c and the various food processing systems at each facility may be communicatively coupled to one another via a private network, e.g., a corporate network or intranet, associated with the respective food processing facilities 130a-c. The various food processing systems at each facility may be communicatively coupled to one another via the facility's private network. Accordingly, communications directed to controllers 132a-c and/or other food processing system components via network 104 may be routed through firewalls 134a, 134b, and 134c (or "firewalls 134a-c"), respectively. Firewalls 134a-c may function to maintain secure communications between devices external to their respective private networks and controllers 132a-c or other components of the food processing systems at each facility. Examples of different types of secure communication channels that may be used for such communications include, but are not limited to, a virtual private network (VPN) connection, Secure Shell (SSH) tunnel, or other type of secure network connection that has a security layer for preventing unauthorized access by external devices, e.g., via network 104.

In one or more embodiments, computing system 110 may function as a control system for providing automated monitoring and control of operational parameters of the various food processing systems located at each of food processing facilities 130a-c. Additional details regarding such a control system will be described in further detail below with respect to FIG. 2.

Figure 2:
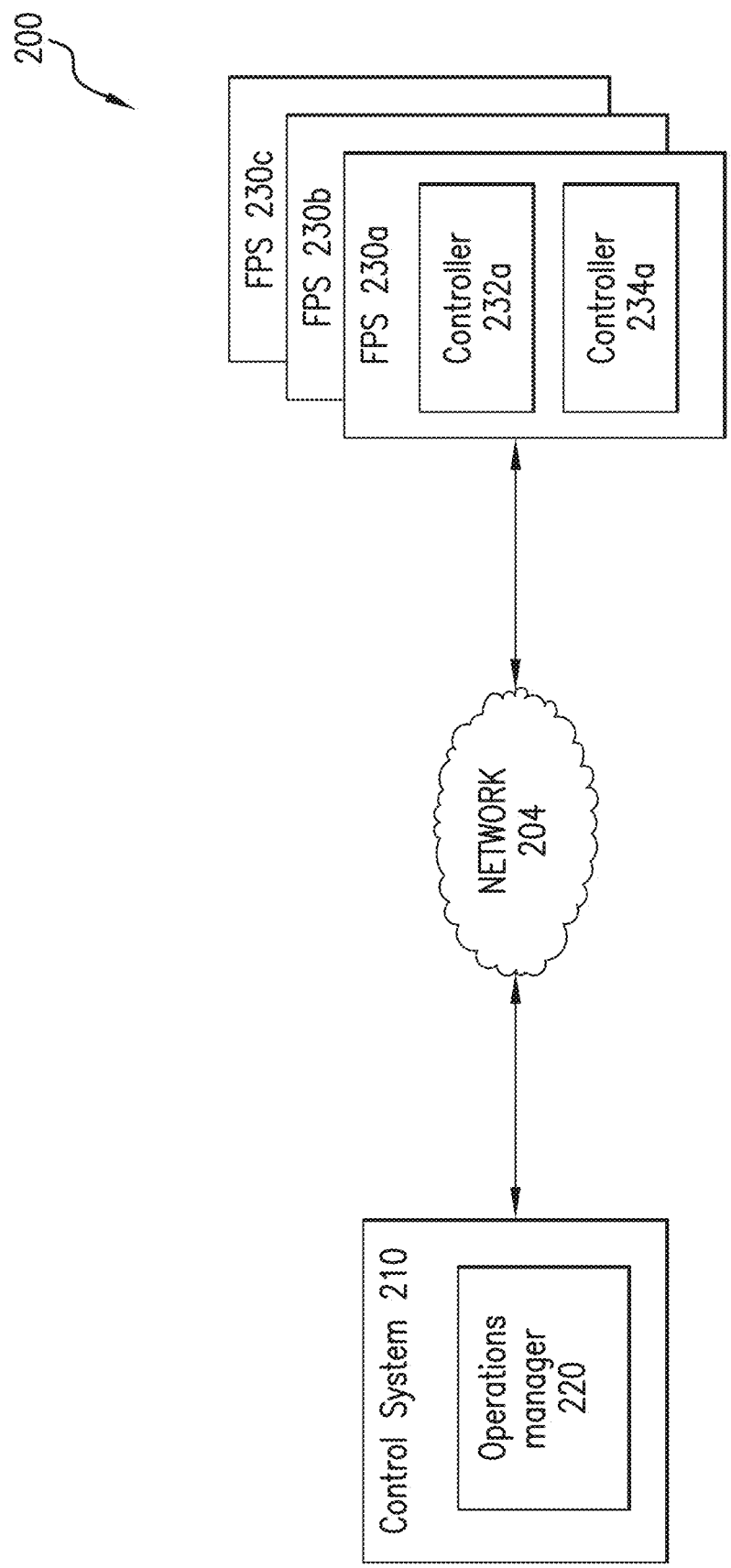
FIG. 2 is a diagram of an exemplary distributed computing system including a control system for automated monitoring and control of remote food processing systems, according to one or more embodiments of the present disclosure.

FIG. 2 is a diagram of an exemplary distributed computing system 200 including a control system 210 for automated monitoring and control of food processing systems located at a remote food processing facility, e.g., any of food processing facilities 130a-c of FIG. 1, as described above. As shown in FIG. 2, control system 210 includes an operations manager 220 that is communicatively coupled to one or more of controllers 232a and 234a of food processing system (FPS) 230a via a network 204, e.g., network 104 of FIG. 1, as described above. In one or more embodiments, each of controllers 232a and 234a may be associated with a different subsystem of food processing system 230a.

While not shown in FIG. 2, it should be appreciated that, like food processing system 230a, each of food processing systems 230b and 230c may include a plurality of controllers and that operations manager 220 may also be communicatively coupled to the controllers of food processing systems 230b and 230c via network 204. Also, while only controllers 232a and 234a are shown in FIG. 2, it should also be appreciated that food processing system 230a (and each of food processing systems 230b and 230c) may include any number of controllers as desired for a particular implementation. Further, while only food processing systems 230a-c are shown in FIG. 2, it should be appreciated that the food processing facility in this example may include any number of food processing systems.

Figure 3:
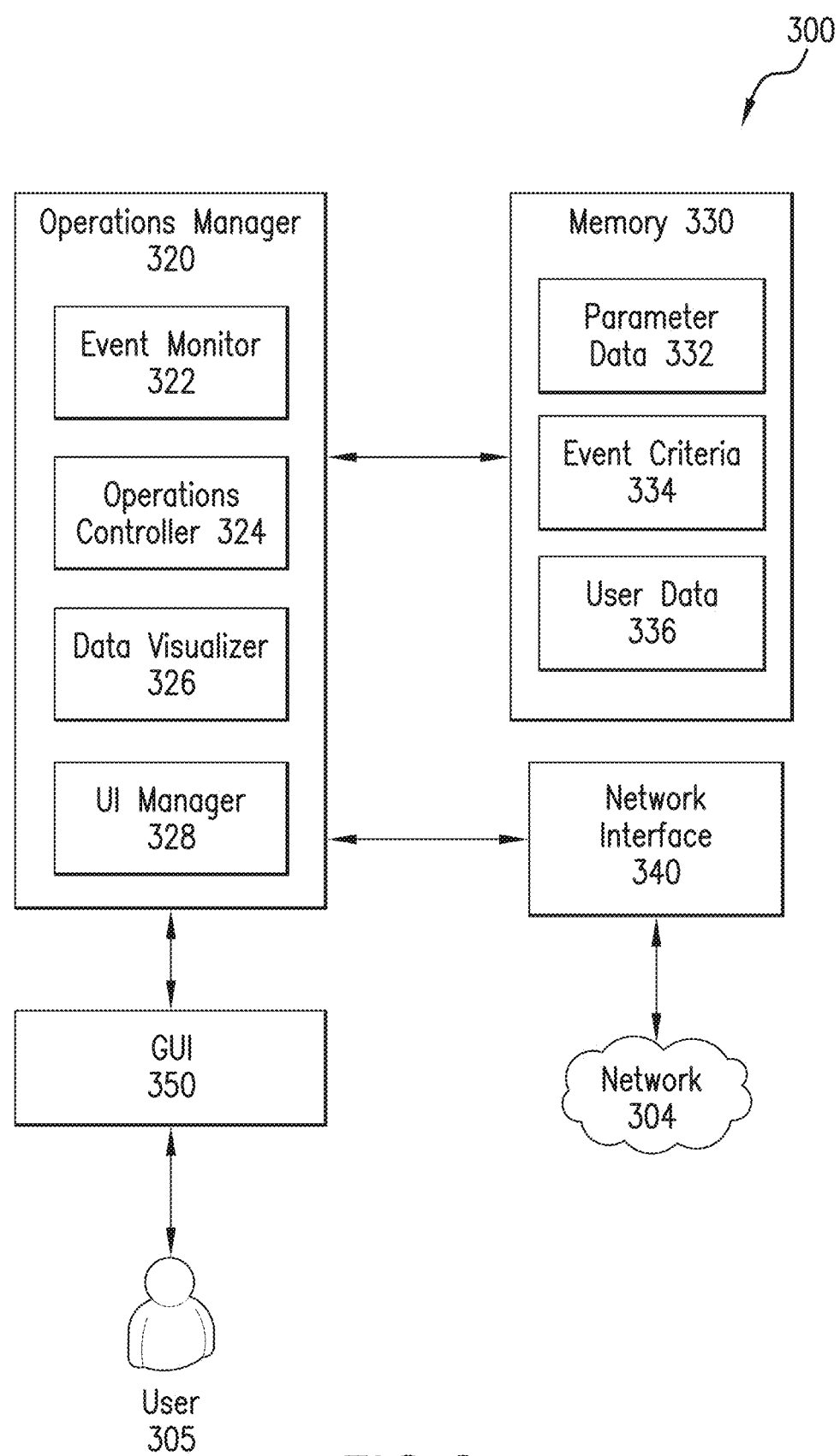
FIG. 3 is a block diagram illustrating an example of the control system of FIG. 2.

FIG. 3 is a block diagram of an exemplary control system 300 for automated monitoring and control of one or more food processing systems (e.g., one or more of food processing systems 230a-c of FIG. 2, as described above) located at a remote food processing facility. As shown in FIG. 3, system 300 includes an operations manager 320, a memory 330, a network interface 340, and a graphical user interface (GUI) 350. Operations manager 320 includes an event monitor 322, an operations controller 324, a data visualizer 326, and a UI manager 328. It should be appreciated that operations manager 320 and its components (event monitor 322, operations controller 324, data visualizer 326, and UI manager 328), memory 330, network interface 340, and GUI 350 may be communicatively coupled to one another via, for example, an internal bus of system 300.

System 300 may be implemented using any type of computing device having one or more processors, a user input device (e.g., a mouse, QWERTY or T9 keyboard, touch-screen, or microphone), and a communications infrastructure capable of receiving and transmitting data over a network. Such a computing device may be, for example and without limitation, a mobile phone, a personal digital assistant (PDA), a tablet computer, a laptop computer, a desktop computer, a workstation, a cluster of computers, a set-top box, or other similar type of device capable of processing instructions and receiving and transmitting data to and from humans and other computing devices. Although only operations manager 320, event monitor 322, operations controller 324, data visualizer 326, and UI manager 328, memory 330, network interface 340, and GUI 350 are shown in FIG. 3, it should be appreciated that system 300 may include additional components and/or sub-components as desired for a particular implementation.

It should also be appreciated that operations manager 320 along with event monitor 322, operations controller 324, data visualizer 326, and UI manager 328 may be implemented in software, firmware, hardware, or any combination thereof. Furthermore, embodiments of event monitor 322, operations controller 324, data visualizer 326, and UI manager 328, or portions thereof, may be implemented to run on any type of processing device including, but not limited to, a desktop or personal computer, workstation, embedded system, networked device, mobile device, or any other type of data processing or computing system capable of carrying out the automated monitoring and control functionality described herein.

Memory 330 may be used to store various types of information accessible to operations manager 320 for performing the automated monitoring and control techniques disclosed herein. As shown in the example of FIG. 3, the information stored in memory 330 may include parameter data 332, event criteria 334, and user data 336, each of which will be described in further detail below. Memory 330 may be any type of recording medium coupled to an integrated circuit that controls access to the recording medium. The recording medium can be, for example and without limitation, a semiconductor memory, a hard disk, or other similar type of memory or storage device. Further, memory 330 may be a memory device integrated within system 300 or an external device communicatively coupled to system 300 via a wired or wireless network connection. In some implementations, memory 330 may be a remote data store, e.g., a cloud-based storage location, accessible via a network 304 by using network interface 340. Network 304 may be any type of network or combination of networks for communicating information between different computing devices. Network 304 may be implemented using, for example, network 104 of FIG. 1, as described above.

In one or more embodiments, event monitor 322 may receive data from one or more controllers of a food processing system via network 304 during operation of the food processing system at a remote food processing facility. The received data may include, for example, information relating to one or more operating parameters of the food processing system, which may be stored in memory 330 as parameter data 332. Such information may have been acquired by, for example, one or more sensors or other measurement devices that are disposed within a subsystem of the food processing system and operatively coupled to a controller associated with the particular subsystem.

Event monitor 322 may use the stored parameter data 332 from memory 330 or the data received directly from the controller(s) of the food processing system to monitor values of one or more of the system's operating parameters. Event monitor 322 may use the monitored values of the one or more operating parameters to detect the occurrence of at least one event of interest during the operation of the food processing system. In one or more embodiments, the occurrence of an event of interest may be detected by event monitor 322 based on predefined criteria for the particular event with respect to a value of at least one operating parameter during the operation of the food processing system. For example, the event detection performed by event monitor 322 may include determining whether monitored values of the operating parameter meet the predefined criteria associated with the particular event of interest at any point during the system's operation or during some predetermined or user-specified time period therein. The predefined criteria for this particular event may be, for example, a predefined range of values for a specified operating parameter. Accordingly, the occurrence of the event may be triggered when the monitored values of the operating parameter are determined to fall within the predefined range during the relevant time period. The predefined criteria for each of a plurality of events of interest may be stored in memory 330 as event criteria 334.

In one or more embodiments, operations controller 324 may transmit control signals for adjusting a configuration of a food processing system based on the detected event. The control signals may be sent via network 304 to the one or more controllers of the food processing system. In some implementations, the control signals may be sent by operations controller 324 only after receiving a command for adjusting the configuration of the food processing system from a user associated with the food processing system. For example, the command may be based on interactions by a user 305 of control system 300 for controlling the configuration of the food processing system via GUI 350. Further, the command may be in response to a notification of the event of interest displayed by UI manager 328 within GUI 350.

Alternatively, the command may be received from a computing device (e.g., any of user devices 120a-c of FIG. 1, as described above) of another remote user associated with the food processing system. In one or more embodiments, UI manager 328 may use network interface 340 to send a notification of the detected event to the remote user's computing device via network 304. The notification may be displayed via, for example, a GUI of a client application executable at the user's computing device. In response to the notification, the remote user may interact with the GUI of the client application for controlling the configuration of the food processing system.

In an embodiment, the relevant parameters and criteria for an event of interest to be detected by event monitor 322 may be specified by user 305 via GUI 350 (or by an authorized remote user associated with the food processing system as described above). For example, user 305 may select the parameters for the event from a list of available operating parameters provided via an options menu of GUI 350, e.g., as shown in FIG. 9 and described in further detail below. Once a set of parameters has been selected for the event of interest, user 305 may specify the criteria for each parameter using additional UI controls presented within GUI 350. For example, user 305 may interact with GUI 350 to specify a range of desired parameter values representing normal operation or minimum and maximum values defining the boundaries or limits for such a range. In one or more embodiments, GUI 350 may include a dashboard view or window for facilitating such user interactions. An example of such a GUI will be described below in reference to FIGS. 4-9. FIGS. 4-9 may illustrate, for example, different views of a GUI for an application program executable at a user's computing device for real-time monitoring and control of remote food processing systems. While the examples in FIGS. 4-9 are described in the context of facilitating user interactions and access to various remote monitoring and control functions, it should be appreciated that the capabilities of such an application program and/or control system at which such a program is executed include automated monitoring and control of food processing systems at one or more remote food processing facilities.

Figure 4:
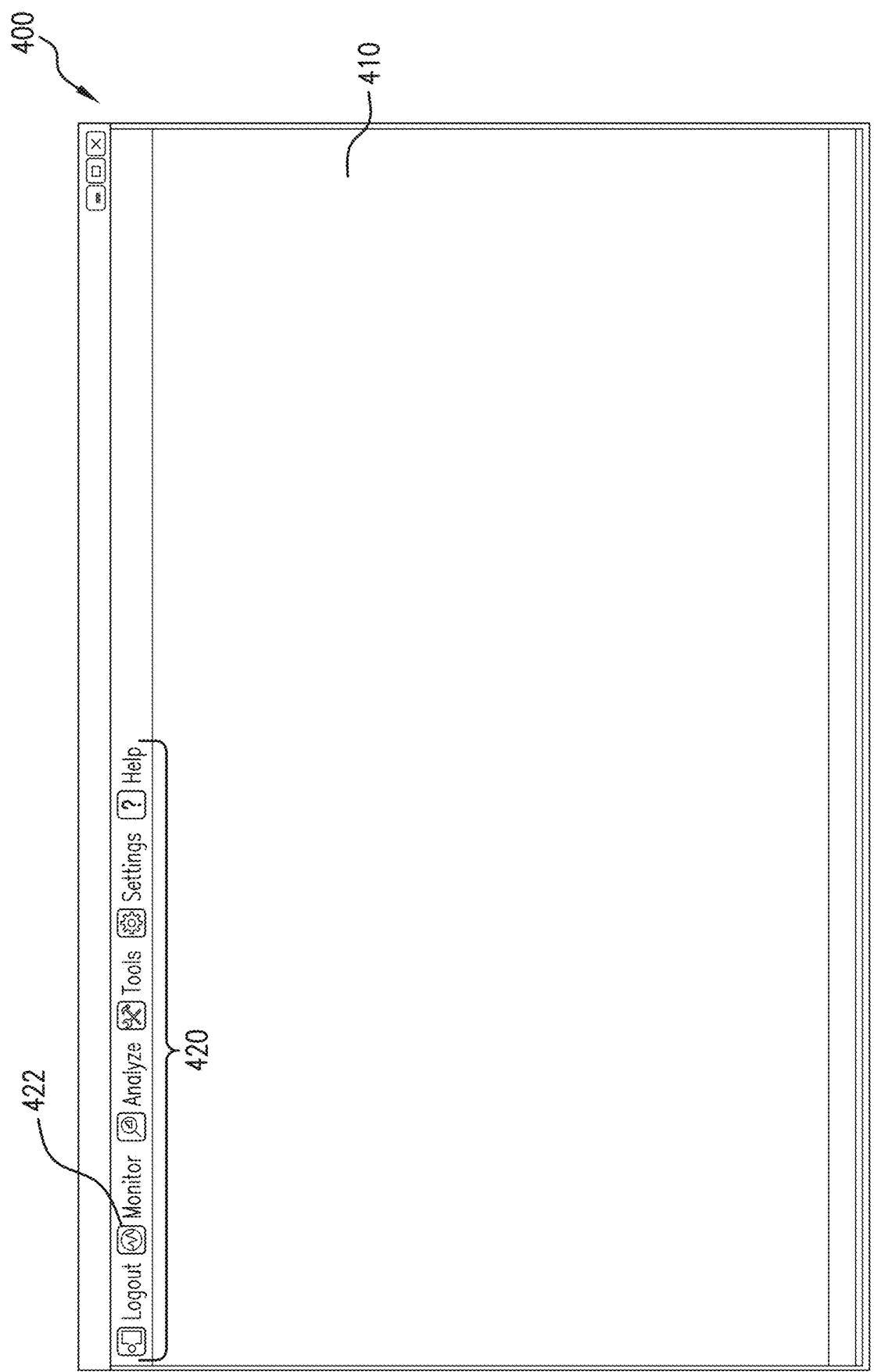
FIG. 4 illustrates an example of a dashboard view for an exemplary graphical user interface (GUI) of a control system for automated monitoring and control of remote food processing systems.

FIG. 4 illustrates an example of such a dashboard view 400 for an exemplary GUI of a control system for automated monitoring and control of remote food processing systems. As shown in FIG. 4, dashboard view 400 includes an interactive workspace area 410 for displaying relevant content and enabling user interactions related to the monitoring and control functionality described herein. Dashboard view 400 may also include a plurality of user controls 420 for invoking various monitoring and control related functions provided to the user. For example, a monitoring control 422 may be provided to the user for invoking various performance monitoring functions related to all connected equipment and sensors for the food processing systems and associated subsystems located at a particular food processing facility. Such functions may include, for example, viewing different types of visualizations of real-time performance data obtained from various data sources associated with one or more of the facility's food processing systems.

Figure 5:
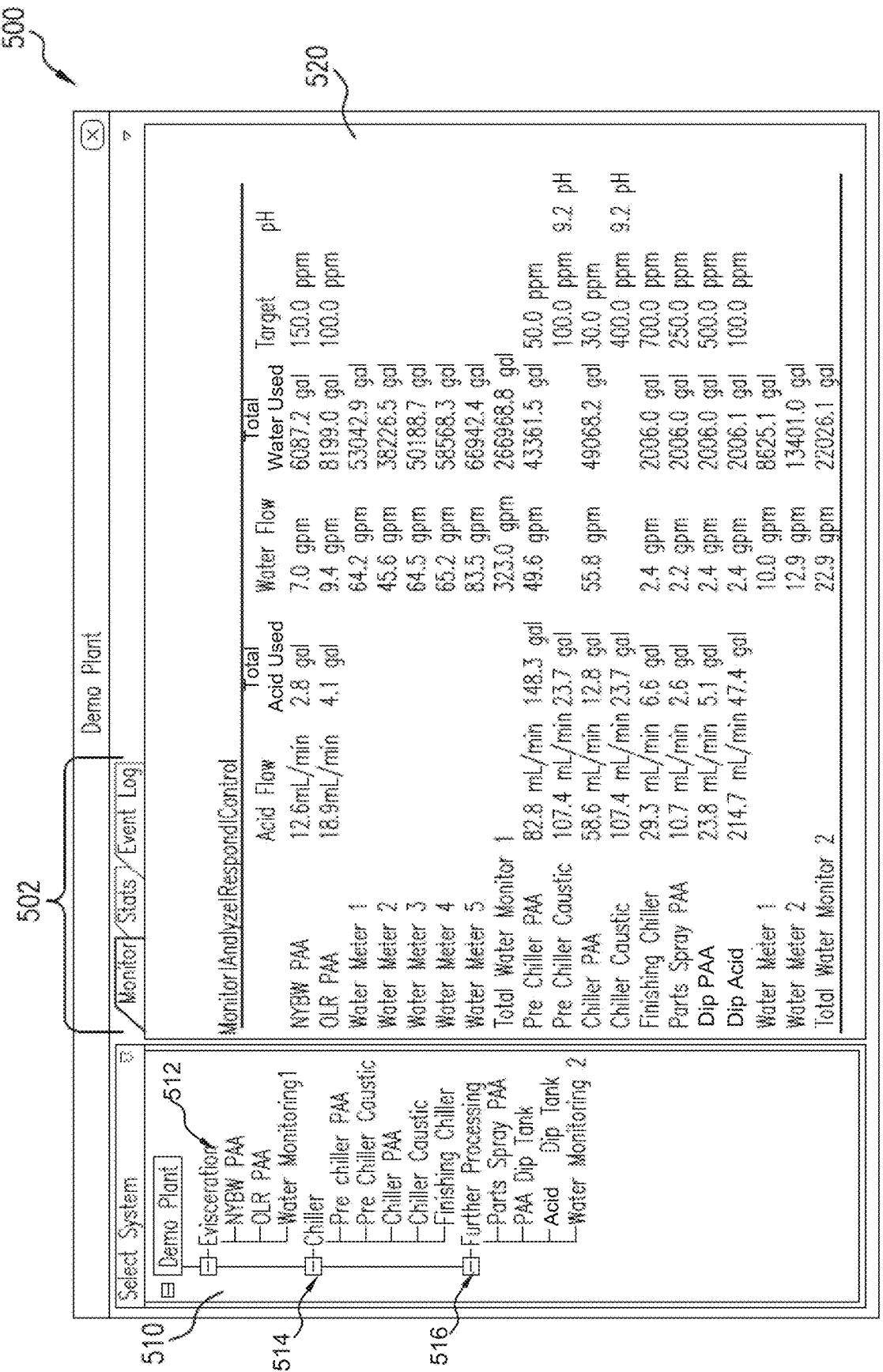
FIG. 5 is an exemplary view of the GUI of FIG. 4 for monitoring real-time performance data of selected food processing systems at a remote food processing facility.

FIG. 5 shows an example of a monitor view 500 of the GUI that may be used to select particular food processing systems and subsystems thereof for performance monitoring purposes. Monitor view 500 may be displayed as a separate window or within workspace area 410 of the GUI as shown in FIG. 4, e.g., in response to the user's selection of control 422. As shown in FIG. 5, the GUI may include a system selection area 510 for selecting particular food processing systems and subsystems as desired. As will be described in further detail below, a content area 520 of the GUI may be used to display different types of information relating to the real-time operating conditions and performance of the selected food processing systems and subsystems in this example during a specified time period.

The food processing systems and subsystems in the example shown in FIG. 5 may be associated with a poultry processing plant. However, it should be appreciated that embodiments of the present disclosure are not intended to be limited thereto and that the disclosed embodiments may be applied to any of various types of processing facilities and systems thereof. For example, the disclosed embodiments may be applied to processing systems for processing a wide variety of "work pieces" including, but not limited to, meat, poultry, fish, fresh and salt water seafood, fruits, vegetables, other foodstuffs, animals, food packaging, items and surfaces related to food or food processing, or any combination of the preceding. The work pieces processed by such systems may be live, dead, raw, hide-on, carcass, pieces, cooked, prepared, processed, partially processed, ready to eat, ready to cook, or any combination of the preceding. Furthermore, in some implementations, such systems may be used to treat work pieces completely unrelated to food or food processing items.

As shown in system selection area 510, the systems of the poultry processing plant in this example may include, but are not limited to, an evisceration system 512, a chiller system 514, and a system 516 for further processing. As will be described in further detail below, each of these systems may include various subsystems for performing one or more stages of a poultry treatment process for washing and decontaminating raw poultry carcasses prior to packaging and storage for commercial distribution. For purposes of this example, it will be assumed that the poultry carcasses have already been defeathered and that any stages of the poultry treatment process prior to defeathering have already been performed. In one or more embodiments, evisceration system 512, chiller system 514, and system 516 may correspond to different zones or areas of the poultry processing plant. Accordingly, the respective subsystems of each system may be various systems located within the corresponding zone of the poultry processing plant, which have been designated to perform one or more particular stages of the poultry treatment process. It should be appreciated that the assignment or designation of processing systems to zones may vary from one processing facility to another, e.g., depending on the particular treatment process associated with each processing facility.

In one or more embodiments, evisceration system 512 may include different antimicrobial subsystems for treating the poultry carcasses with an antimicrobial composition during washing stages before and after evisceration, e.g., during a post-feather pick (or "New York dress") wash (also referred to herein as a "New York Bird Wash" or "NYBW") before evisceration and during on-line reprocessing (OLR) after evisceration. During each washing stage, the appropriate antimicrobial subsystem of evisceration system 512 may be used to apply the antimicrobial composition to the poultry carcasses in any number of different ways. Examples of different ways in which the antimicrobial composition may be applied include, but are not limited to, spraying, misting, fogging, immersing, pouring, dripping, any other method of application, or any combination of the preceding. The antimicrobial composition that is applied may include any type of antimicrobial for treating work pieces (e.g., poultry carcasses). Examples of such an antimicrobial include, but are not limited to, peracetic acid (or "PAA"), a quaternary ammonium compound, an alkylpyridinium chloride, cetylpyridinium chloride, any other suitable antimicrobial, or any combination of the preceding.

Accordingly, the antimicrobial subsystems of evisceration system 512 may include, for example, a NYBW spray washer for applying PAA to defeathered poultry carcasses before evisceration and an OLR spray washer for applying PAA to the poultry after evisceration. It should be appreciated that the poultry treatment process may include any number of additional washing steps, which may be performed by other systems or subsystems of the poultry processing plant in this example. An example of such an additional washing stage may include, but is not limited to, an inside-outside washing stage performed by an inside-outside bird washer.

Following evisceration, the poultry carcasses may move along the conveyor line to chiller system 514. In one or more embodiments, chiller system 514 may include different types of chillers for different stages of a chilling process and different types of antimicrobial compositions. As shown in the example of FIG. 5, chiller system 514 may include various types of pre-chillers and primary chillers for both PAA and caustic chemical compounds along with a finishing chiller. Each chiller may include various sensors for monitoring temperatures during each stage of the chilling process, e.g., to ensure that temperatures remain within a specified range for that particular stage.

After chilling, the poultry may be subjected to further processing including, but not limited to, portioning, deboning, weighing, and quality grading. System 516 of the poultry processing plant in this example may be used to perform additional washing stages for applying antimicrobial compositions to the poultry during any of these further processing steps of the poultry treatment process. Like evisceration system 512 described above, system 516 may include various antimicrobial subsystems for applying the antimicrobial compositions to the poultry after chilling. For example, system 516 may include a parts spray washer for applying PAA to poultry parts and various dip tanks for submerging the poultry within PAA and other types of antimicrobial compositions, e.g., any of various GRAS (generally recognized as safe) acid solutions.

In one or more embodiments, each of the antimicrobial subsystems of evisceration system 512 and system 516 may include an antimicrobial application system, an antimicrobial recycle system, and an antimicrobial capture system. The antimicrobial application system may include a housing through which raw poultry or other types of work pieces may be moved along a conveyor line. The housing may include a spray washer for applying the antimicrobial composition to the work pieces as they move along the conveyor line. A drip tray or pan extending downstream of the housing may be disposed below the conveyor and the work pieces. A rigid member, such as stainless steel tubing, may be affixed to the housing. The rigid member may have parallel arms that are aligned on opposite sides of the conveyor line. A series of matching openings may be provided in each arm for housing counters or sensors for automatically detecting the presence of individual work pieces during processing and counting the total number of work pieces processed over time. For example, a total count of the work pieces processed over a period of time may be used to assess a current workload of the system and make any appropriate operational adjustments that may be needed to handle that workload.

In one or more embodiments, the antimicrobial recycle system may be coupled to the antimicrobial application system. The antimicrobial recycle system may be configured to produce the antimicrobial composition at a predetermined concentration and supply the antimicrobial composition to the antimicrobial application system. The antimicrobial recycle system may be further configured to receive unused portions of the antimicrobial composition, recycle the unused portions of the antimicrobial composition, and resupply the recycled antimicrobial composition to the antimicrobial application system. In some implementations, the antimicrobial recycle system may produce the antimicrobial composition by diluting a concentrated antimicrobial composition (or solution) using, for example, water (or any other solubility enhancing agents) to obtain a dilute antimicrobial composition with a particular concentration (e.g., within a predetermined concentration range), and may further provide the dilute antimicrobial composition to the antimicrobial application system described above.

In one or more embodiments, the antimicrobial capture system may be configured to receive discarded portions of the antimicrobial composition from the antimicrobial application system or the antimicrobial recycle system during processing. The antimicrobial capture system may include a container filled with carbon granules submerged in water or other liquid for removing antimicrobials from discarded portions of the antimicrobial composition applied to work pieces (e.g., poultry carcasses) by the antimicrobial application system.

In one or more embodiments, each of systems 512 and 516 may also include a water monitoring system for monitoring water usage during different stages of the poultry treatment process described herein. In some implementations, the water monitoring system may be used to monitor a dilution ratio of the antimicrobial composition to water during the poultry treatment process. For example, the water monitoring system may include a water meter coupled to the antimicrobial recycle system or a controller thereof to monitor the dilution ratio of the antimicrobial composition produced by the antimicrobial recycle system. If necessary, adjustments to the water flow and/or antimicrobial concentration may be made to achieve a desired dilution ratio or ensure that the dilution ratio stays within a desired range, e.g., less than or equal to approximately 1 part dilute composition to 1 part water, less than or equal to approximately 1 part dilute composition to 30 parts water, less than or equal to approximately 1 part dilute composition to 60 parts water, or any other dilution ratio.

In one or more embodiments, systems 512, 514, and 516 and the respective antimicrobial subsystems thereof may include various sensors for measuring different operating parameters for each system or subsystem thereof. Such operating parameters may relate to, for example, the antimicrobial composition being applied to the work pieces (e.g., raw poultry) at each processing stage (e.g., each stage of the poultry treatment process described above). Examples of such conditions or parameters include, but are not limited to, an antimicrobial concentration, an application frequency, an application pressure, a pH, and a temperature of the antimicrobial composition that is applied over a period of time. Any of various types of sensors may be used. Examples of such sensors include, but are not limited to, infrared, visible light, or ultraviolet (UV) sensors. Examples of such UV sensors include, but are not limited to, a UV light spectrophotometer or UV spec sensor.

Accordingly, each antimicrobial subsystem may include sensors for measuring the concentration of antimicrobials within the antimicrobial composition that is applied over the period of time, the frequency and pressure at which the composition is applied, and the pH and temperature of the antimicrobial composition during this period of time. It should be appreciated that in addition to sensors for measuring pH and temperature, sensors for measuring any of various other properties of the antimicrobial composition may also be used as desired for a particular implementation.

In one or more embodiments, the measurements collected by the sensors may be used to monitor the operating conditions of each system or subsystem at each stage of the antimicrobial treatment or poultry treatment process in this example. Such sensors may be communicatively coupled to a control unit or controller (e.g., controller 232a or 232b of FIG. 2, as described above) of a corresponding system or subsystem thereof. The sensors may be configured to provide the collected measurements, e.g., in the form of data signals, to the controller. The controller may then transmit the signals to a remote monitoring and control system (e.g., control system 210 of FIG. 2, as described above) for monitoring and control of system operations via a communication network (e.g., network 204 of FIG. 2, as described above). Alternatively, the sensors and/or subsystems of each system may be configured to send the collected measurements or data signals directly to the remote monitoring and control system via the communication network.

In one or more embodiments, the remote monitoring and control system may be configured to process the data signals received from the controllers or sensors of the various systems of the food processing facility (e.g., poultry processing plant) at each stage of the antimicrobial treatment. The remote system may use the received signals to monitor one or more operating parameters of interest for a particular system or subsystem thereof and make any necessary adjustments to the configuration of the system/subsystem based on the monitoring, e.g., to ensure that the operating parameter(s) stay within a specified or desired range during the treatment. For example, the remote system may make such adjustments by sending control signals via the communication network to a controller of the subsystem or system. The control signals may include commands or instructions for the controller to activate, deactivate, or modulate system pumps, valves, or other system components, e.g., in order to regulate the antimicrobial concentration, application frequency, pressure, pH, and/or temperature of the antimicrobial composition applied at each stage of the treatment. In this way, the data and control signals exchanged between the remote system and the systems/subsystems of the food processing facility (or poultry processing plan in this example) via the communication network enables the automated monitoring and control of system operations over the course of the treatment.

In addition to the automated monitoring and control functions described above, the disclosed techniques may be used to provide various functions to the user via selectable UI controls (e.g., tab controls) within a tab control area 502 of the GUI in this example. Tab control area 502 may allow the user to select between different tabs for monitoring operating conditions of one or more selected systems (e.g., via a "Monitor" tab), viewing statistics or metrics related to system performance and operating conditions (e.g., via a "Stats" tab), and viewing a log of various events of interest that may have occurred over a specified time period during the operation of each system (e.g., via an "Event Log" tab). In response to the user's selection of a particular tab, the information displayed within content area 520 may be updated accordingly. For example, in response to the user's selection of the Monitor tab control within tab control area 502, content area 520 may display a listing of the selected food processing systems and subsystems along with data for monitoring the operating conditions or parameters of each system/subsystem. As shown in FIG. 5, such data may include real-time operational data relating to water usage as well as the flow, concentration, and pH of the antimicrobial compositions used in each system/subsystem.

Figure 6:
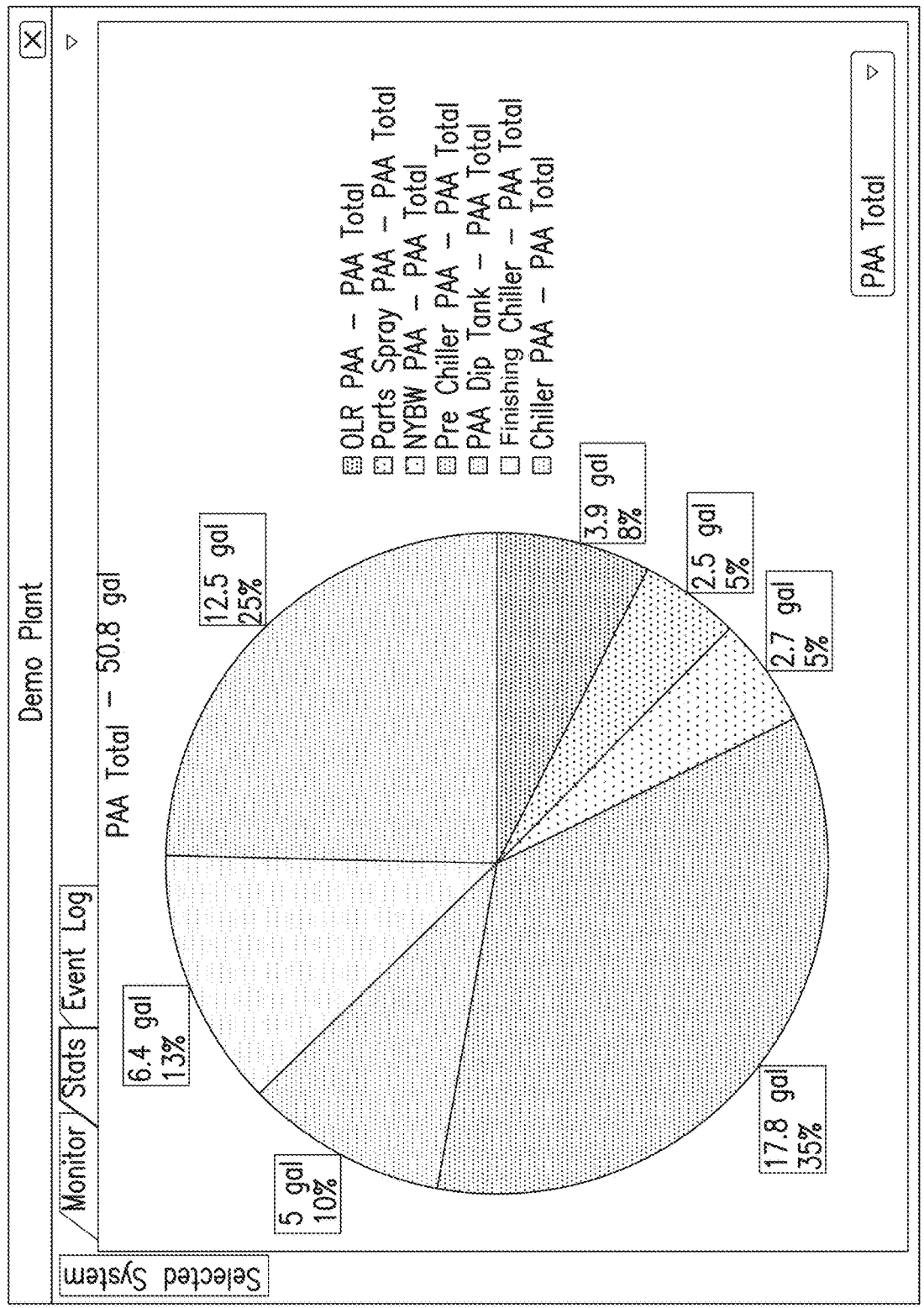
FIG. 6 illustrates an exemplary visualization of performance metrics for various food processing systems at a remote food processing facility.
Figure 7:
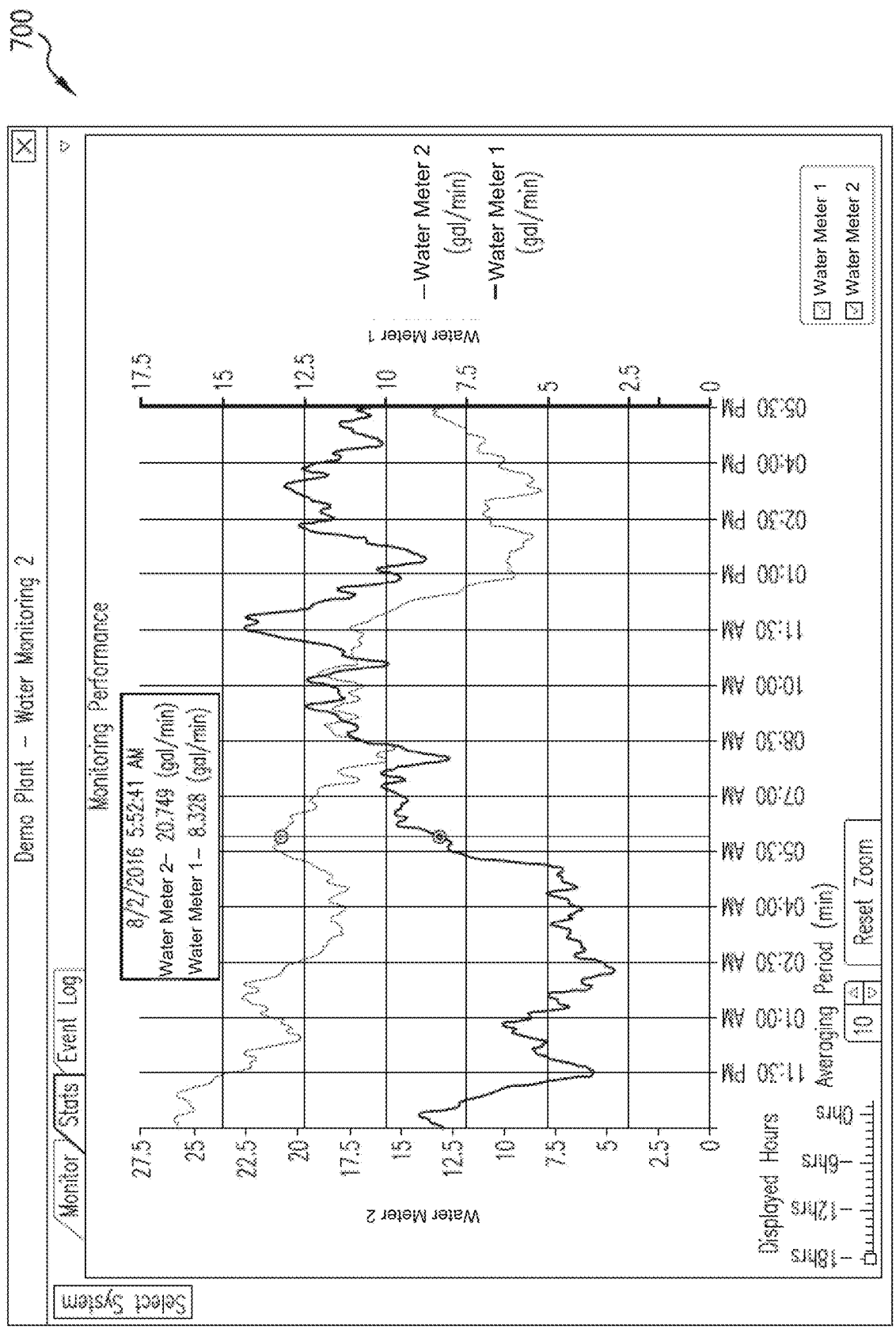
FIG. 7 illustrates another exemplary visualization of performance metrics for various food processing systems at a remote food processing facility.

In one or more embodiments, content area 520 of the GUI may be updated to display a visualization of performance metrics in response to the user's selection of the Stats tab control within tab control area 502. Referring back to FIG. 3, data visualizer 326 of control system 300 may be used to calculate such performance metrics based on values of one or more operating parameters monitored by event monitor 322 during the operation of the selected food processing system. Data visualizer 326 may also generate a visualization of the performance metrics. The generated visualization may be displayed via, for example, dashboard view 400 of the GUI, as shown in FIG. 4. Examples of different types of visualizations that may be generated and displayed via the GUI include pie charts (as shown in FIG. 6) and line graphs (as shown in FIG. 7).

In one or more embodiments, content area 520 may be updated to display an event log, as shown in FIG. 8. FIG. 8 shows a view 800 of the GUI with an example of the event log for monitoring different events of interest during a period of operation of the food processing systems and subsystems selected by the user in this example. The particular events of interest that appear within the event log may be based on, for example, one or more parameters specified by the user for each event. Such parameters may be selected by the user from a list of available operating parameters for a particular food processing system. The user in this example may also specify criteria, e.g., a value or range of values for each of the parameter(s), which must be met in order for the corresponding event to be detected or triggered, as described above. In this way, the user may use the GUI to create a list of predefined events. In one or more embodiments, the user may also use the GUI to control settings for receiving notifications or alerts of particular events of interest that occur during the operation of the food processing system. For example, the particular events of interest may be selected from a list of predefined events provided to the user.

Such a list may be provided via an options menu or a settings panel of the GUI, as shown in FIG. 9. As shown in FIG. 9, a notification settings panel 900 of the GUI includes a list 910 of various food processing systems of a food processing facility that may be selected by the user along with a list 920 of various events for which different types of notifications or alerts may be selected by the user for monitoring the operations of a particular system.

Figure 10:
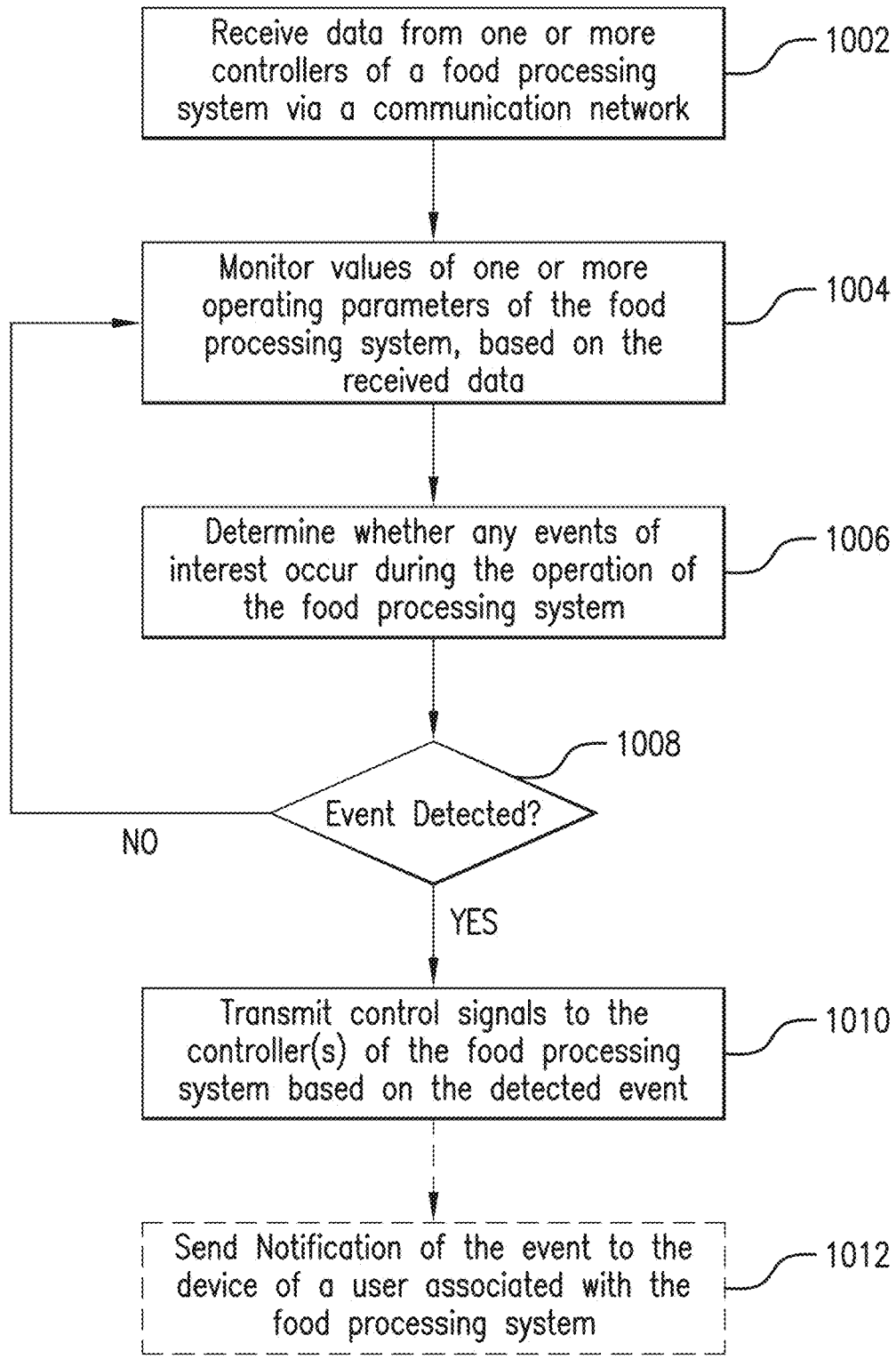
FIG. 10 is a flow diagram of a method of automated monitoring and control of remote food processing systems.

FIG. 10 is a process flowchart of a method 1000 for automated monitoring and control of remote food processing systems. For purposes of discussion, method 1000 will be described with reference to control system 300 of FIG. 3, as described above. However, method 1000 is not intended to be limited thereto.

Method 1000 begins in step 1002, which includes receiving data from one or more controllers of a food processing system via a communication network. The data may be received from the controller(s) during operation of the food processing system at a remote food processing facility. As described above, the food processing system may be one of a plurality of food processing systems located at the remote food processing facility. An example of such a food processing facility is a poultry processing facility. The plurality of food processing systems in this example may include, but are not limited to, an evisceration system, a chiller system, an antimicrobial application system, an antimicrobial recycle system, and an antimicrobial capture system.

In step 1004, values of one or more operating parameters of the food processing system are monitored, based on the data received in step 1002.

Method 1000 then proceeds to steps 1006 and 1008, which include determining or detecting whether any events of interest occur during the operation of the food processing system. As described above, this may include determining whether monitored values of the operating parameter meet predefined criteria associated with at least one event of interest during the operation of the food processing system. In one or more embodiments, the occurrence of an event of interest is detected based on predefined criteria for the particular event of interest with respect to a value of at least one operating parameter during the operation of the food processing system.

If at least one event of interest occurring during the operation of the food processing system is detected (step 1008), method 1000 proceeds to step 1010. Otherwise, method 1000 returns to step 1004, in which the values of one or more operating parameters of the food processing system are monitored based on the data received (step 1002) from the one or more controllers of the food processing system.

In step 1010, control signals for adjusting a configuration of the food processing system are transmitted to the one or more controllers via the communication network, based on the detected event.

As shown in FIG. 10, method 1000 may also include an optional step 1012, in which a notification of the detected event is sent to a computing device (e.g., a mobile device) of a user associated with the food processing system. In one or more embodiments, the notification may be sent to the user's computing device for display via a graphical user interface (GUI) of a client application executable at the user's computing device. The user may interact with the GUI for purposes of controlling the configuration of the food processing system, e.g., by selecting appropriate commands via the GUI. Thus, in some implementations, the transmission of control signals in step 1010 may be performed only after the notification to the user's device has been sent in step 1012 and the appropriate commands have been received from the user's device in response to the notification.

In one or more embodiments, the one or more operating parameters monitored in step 1004 may be selected by the user from a list of available operating parameters provided via an options menu of the GUI of the client application executable at the user's computing device. As described above and shown in FIG. 5, the GUI may include a dashboard view for presenting information related to the operation of the food processing system over a specified time period.

In one or more embodiments, the event of interest that may be detected in step 1008 is one of a plurality of events specified by the user via a control panel of the GUI. The event of interest may be displayed for the user via the GUI, e.g., as part of an event log displayed within the dashboard view of the GUI. An example of such an event log is shown in FIG. 8. In addition to displaying specified events of interest, the GUI of the application executable at the user's device may be used to present performance metrics related to the operation of the food processing system for the specified time period. The performance metrics may be calculated based on the monitored values of the one or more operating parameters from step 1004. In one or more embodiments, a visualization of the performance metrics may be generated for display at the user's computing device via the dashboard view of the GUI.

Figure 11:
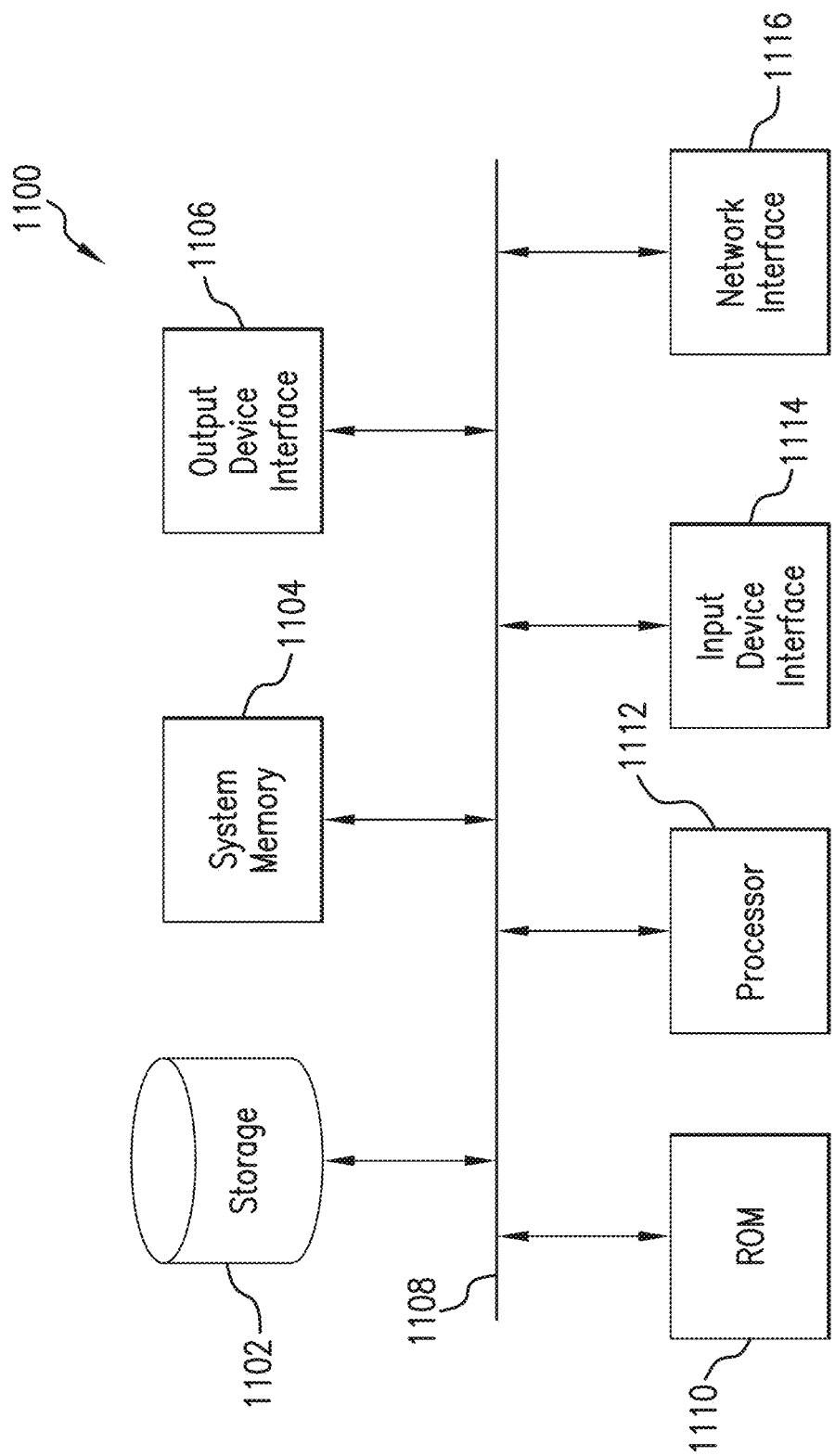
FIG. 11 is a block diagram illustrating an example of a computer system in which embodiments of the present disclosure may be implemented.

FIG. 11 is a block diagram of an exemplary computer system 1100 in which embodiments of the present disclosure may be implemented. For example, the steps of method 1000 of FIG. 10, as described above, may be implemented using system 1100. System 1100 can be a computer, phone, PDA, or any other type of electronic device. Such an electronic device includes various types of computer readable media and interfaces for various other types of computer readable media. As shown in FIG. 11, system 1100 includes a permanent storage device 1102, a system memory 1104, an output device interface 1106, a system communications bus 1108, a read-only memory (ROM) 1110, processing unit(s) 1112, an input device interface 1114, and a network interface 1116.

Bus 1108 collectively represents all system, peripheral, and chipset buses that communicatively connect the numerous internal devices of system 1100. For instance, bus 1108 communicatively connects processing unit(s) 1112 with ROM 1110, system memory 1104, and permanent storage device 1102.

From these various memory units, processing unit(s) 1112 retrieves instructions to execute and data to process in order to execute the processes of the subject disclosure. The processing unit(s) can be a single processor or a multi-core processor in different implementations.

ROM 1110 stores static data and instructions that are needed by processing unit(s) 1112 and other modules of system 1100. Permanent storage device 1102, on the other hand, is a read-and-write memory device. This device is a non-volatile memory unit that stores instructions and data even when system 1100 is off. Some implementations of the subject disclosure use a mass-storage device (such as a magnetic or optical disk and its corresponding disk drive) as permanent storage device 1102.

Other implementations use a removable storage device (such as a floppy disk, flash drive, and its corresponding disk drive) as permanent storage device 1102. Like permanent storage device 1102, system memory 1104 is a read-and-write memory device. However, unlike storage device 1102, system memory 1104 is a volatile read-and-write memory, such as random access memory. System memory 1104 stores some of the instructions and data that the processor needs at runtime. In some implementations, the processes of the subject disclosure are stored in system memory 1104, permanent storage device 1102, and/or ROM 1110. For example, the various memory units include instructions for performing the steps of method 1000 of FIG. 10, as described above. From these various memory units, processing unit(s) 1112 retrieves instructions to execute and data to process in order to execute the processes of some implementations.

Bus 1108 also connects to input and output device interfaces 1114 and 1106. Input device interface 1114 enables the user to communicate information and select commands to the system 1100. Input devices used with input device interface 1114 include, for example, alphanumeric, QWERTY, or T9 keyboards, microphones, and pointing devices (also called "cursor control devices"). Output device interface 1106 enables, for example, the display of images generated by the system 1100. Output devices used with output device interface 1106 include, for example, printers and display devices, such as cathode ray tubes (CRT) or liquid crystal displays (LCD). Some implementations include devices such as a touchscreen that functions as both an input and output device. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 11, bus 1108 couples system 1100 to a public or private network (not shown) or combination of networks through a network interface 1116. Such a network may include, for example, a local area network ("LAN"), such as an Intranet, or a wide area network ("WAN"), such as the Internet. Any or all components of system 1100 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of method 1000 of FIG. 10, as described above, may be implemented using system 1100 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

While specific details about the above embodiments have been described, the above hardware and software descriptions are intended merely as example embodiments and are not intended to limit the structure or implementation of the disclosed embodiments. For instance, although many other internal components of the system 1100 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method comprising:
receiving, via a communication network, data from one or more controllers of each food processing system of a remote food processing facility, wherein food processing systems of the remote food processing facility include a plurality of poultry processing systems corresponding to different stages of a poultry treatment process;
monitoring values of one or more operating parameters for each poultry processing system as the poultry is processed by that poultry processing system over one or more stages of the poultry treatment process, based on the received data, wherein the one or more operating parameters include a dilution ratio representing a concentration of antimicrobials relative to water within an antimicrobial composition applied to the poultry carcasses by a corresponding antimicrobial subsystem of the poultry processing system at each of the one or more stages of the poultry treatment process;
detecting at least one event of interest for at least one poultry processing system of the remote food processing facility during at least one stage of the poultry treatment process, based on the monitored values of the one or more operating parameters;
transmitting, via the communication network to the corresponding one or more controllers of the at least one poultry processing system at the remote food processing facility, control signals for adjusting a configuration of the at least one poultry processing system based on the detected event of interest, wherein the control signals include signals for making appropriate adjustments to the concentration of antimicrobials relative to water within the antimicrobial composition applied during the at least one stage of the poultry treatment process by the corresponding antimicrobial subsystem of the at least one poultry processing system such that the dilution ratio stays within a predetermined range for the at least one stage of the poultry treatment process;
sending, via the communication network to a computing device of a user associated with the at least one poultry processing system, a notification of the detected event of interest;
wherein the notification is sent to the user's computing device for display via a graphical user interface (GUI) of a client application executable at the user's computing device, and the GUI includes user interface controls for the user to adjust the configuration of the at least one poultry processing system; and
wherein the one or more operating parameters are selected by the user from a list of available operating parameters provided via an options menu of the GUI of the client application executable at the user's computing device, and the GUI includes a dashboard view for presenting information related to the operation of the food processing system over a specified time period.

2. The method of claim 1, wherein the occurrence of the event of interest is detected based on predefined criteria for the particular event of interest with respect to a value of at least one operating parameter during the operation of the food processing system.

3. The method of claim 1, wherein the control signals are transmitted to the one or more controllers of the at least one poultry processing system in response to receiving a command from the user's computing device for adjusting the configuration of the at least one poultry processing system based on the detected event of interest.

4. The method of claim 1, wherein the user's computing device is a mobile device.

5. The method of claim 1, wherein the event of interest is one of a plurality of events specified by the user via a control panel of the GUI, and the event of interest is displayed as part of an event log within the dashboard view of the GUI.

6. The method of claim 5, further comprising:
calculating performance metrics related to the operation of the food processing system for the specified time period, based on the monitored values of the one or more operating parameters; and
generating a visualization of the performance metrics to be displayed via the dashboard view of the GUI.

7. The method of claim 1, wherein the remote food processing facility is one of a plurality of remote food processing facilities for which operating parameters of corresponding food processing systems are monitored.

8. The method of claim 1, wherein the remote food processing facility is a poultry processing facility, the plurality of poultry processing systems correspond to different zones of the poultry processing facility, the plurality of poultry processing systems include at least one of an evisceration system or a chiller system, and each antimicrobial subsystem of the respective poultry processing systems is at least one of an antimicrobial application system, an antimicrobial recycle system, or an antimicrobial capture system that is located within a corresponding zone of the poultry processing facility at which one or more stages of the poultry treatment process are performed.

9. A system for monitoring and control of food processing systems, the system comprising:
a processor; and
a memory coupled to the processor, the memory including instructions, which, when executed by the processor, cause the processor to perform a plurality of functions, including functions to:
receive, via a communication network, data from one or more controllers of each food processing system of a remote food processing facility, wherein food processing systems of the remote food processing facility include a plurality of poultry processing systems corresponding to different stages of a poultry treatment process;
monitor values of one or more operating parameters for each poultry processing system as the poultry is processed by that poultry processing system over one or more stages of the poultry treatment process, based on the received data, wherein the one or more operating parameters include a dilution ratio representing a concentration of antimicrobials relative to water within an antimicrobial composition applied to the poultry carcasses by a corresponding antimicrobial subsystem of the poultry processing system at each of the one or more stages of the poultry treatment process;
detect at least one event of interest for at least one poultry processing system of the remote food processing facility during at least one stage of the poultry treatment process, based on the monitored values of the one or more operating parameters; and
transmit, via the communication network to the corresponding one or more controllers of the at least one poultry processing system at the remote food processing facility, control signals for adjusting a configuration of the at least one poultry processing system based on the detected event of interest, wherein the control signals include signals for making appropriate adjustments to the concentration of antimicrobials relative to water within the antimicrobial composition applied during the at least one stage of the poultry treatment process by the corresponding antimicrobial subsystem of the at least one poultry processing system such that the dilution ratio stays within a predetermined range for the at least one stage of the poultry treatment process;
wherein:
the functions performed by the processor further include functions to send a notification of the detected event to a computing device of a user associated with the at least one poultry processing system;
the notification is sent to the user's computing device for display via a graphical user interface (GUI) of a client application executable at the user's computing device;
the GUI includes user interface controls for the user to adjust the configuration of the at least one poultry processing system; and
the control signals are transmitted to the one or more controllers of the at least one poultry processing system in response to receiving a command from the user's computing device for adjusting the configuration of the at least one poultry processing system based on the detected event of interest
the one or more operating parameters are selected by the user from a list of available operating parameters provided via an options menu of the GUI of the client application executable at the user's computing device, the GUI includes a dashboard view for presenting information related to the operation of the food processing system over a specified time period, and the event of interest is one of a plurality of events specified by the user via a control panel of the GUI, and the event of interest is displayed as part of an event log within the dashboard view of the GUI.

10. The system of claim 9, wherein the occurrence of the event of interest is detected based on predefined criteria for the particular event of interest with respect to a value of at least one operating parameter during the operation of the food processing system.

11. The system of claim 9, wherein the functions performed by the processor further include functions to:
calculate performance metrics related to the operation of the food processing system for the specified time period, based on the monitored values of the one or more operating parameters; and
generate a visualization of the performance metrics to be displayed via the dashboard view of the GUI.

12. The system of claim 9, wherein the remote food processing facility is one of a plurality of remote food processing facilities for which operating parameters of corresponding food processing systems are monitored.

13. The system of claim 9, wherein the remote food processing facility is a poultry processing facility, the plurality of poultry processing systems correspond to different zones of the poultry processing facility, the plurality of poultry processing systems include at least one of an evisceration system or a chiller system, and each antimicrobial subsystem of the respective poultry processing systems is at least one of an antimicrobial application system, an antimicrobial recycle system, or an antimicrobial capture system that is located within a corresponding zone of the poultry processing facility at which one or more stages of the poultry treatment process are performed.

14. A non-transitory computer-readable medium having instructions stored therein, which, when executed by a processor, cause the processor to perform a plurality of functions, including functions to:
- receive, via a communication network, data from one or more controllers of each food processing system of a remote food processing facility, wherein food processing systems of the remote food processing facility include a plurality of poultry processing systems corresponding to different stages of a poultry treatment process;
- monitor values of one or more operating parameters for each poultry processing system as the poultry is processed by that poultry processing system over one or more stages of the poultry treatment process, based on the received data, wherein the one or more operating parameters include a dilution ratio representing a concentration of antimicrobials relative to water within an antimicrobial composition applied to the poultry carcasses by a corresponding antimicrobial subsystem of the poultry processing system at each of the one or more stages of the poultry treatment process;
- detect at least one event of interest for at least one poultry processing system of the remote food processing facility during at least one stage of the poultry treatment process, based on the monitored values of the one or more operating parameters; and
- transmit, via the communication network to the corresponding one or more controllers of the at least one poultry processing system at the remote food processing facility, control signals for adjusting a configuration of the at least one poultry processing system based on the detected event of interest, wherein the control signals include signals for making appropriate adjustments to the concentration of antimicrobials relative to water within the antimicrobial composition applied during the at least one stage of the poultry treatment process by the corresponding antimicrobial subsystem of the at least one poultry processing system such that the dilution ratio stays within a predetermined range for the at least one stage of the poultry treatment process;

wherein:
- the functions performed by the processor further include functions to send a notification of the detected event to a computing device of a user associated with the at least one poultry processing system;
- the notification is sent to the user's computing device for display via a graphical user interface (GUI) of a client application executable at the user's computing device;
- the GUI includes user interface controls for the user to adjust the configuration of the at least one poultry processing system; and
- the control signals are transmitted to the one or more controllers of the at least one poultry processing system in response to receiving a command from the user's computing device for adjusting the configuration of the at least one poultry processing system based on the detected event of interest
- the one or more operating parameters are selected by the user from a list of available operating parameters provided via an options menu of the GUI of the client application executable at the user's computing device, the GUI includes a dashboard view for presenting information related to the operation of the food processing system over a specified time period, and the event of interest is one of a plurality of events specified by the user via a control panel of the GUI, and the event of interest is displayed as part of an event log within the dashboard view of the GUI.

* * * * *